Figure 1:
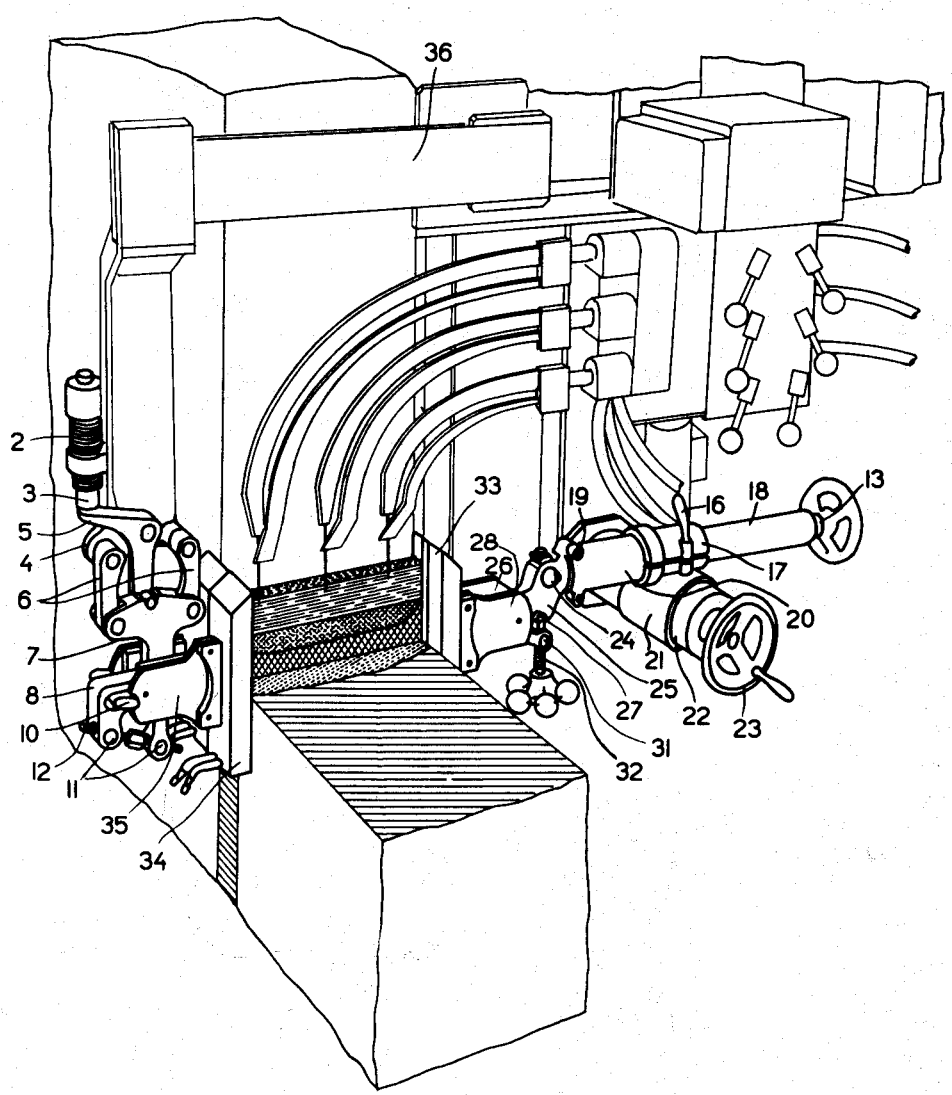

Feb. 23, 1965  M. BISTÁK  3,170,430
INSTALLATION FOR WELDING OR CASTING UNDER
MOLTEN SLAG COOLED CLOSURE PLATES
Filed Jan. 24, 1962  2 Sheets-Sheet 1

INVENTOR.
Michal Bisták
BY
Richard Low
Agt

Feb. 23, 1965 M. BISŤÁK 3,170,430
INSTALLATION FOR WELDING OR CASTING UNDER
MOLTEN SLAG COOLED CLOSURE PLATES
Filed Jan. 24, 1962 2 Sheets-Sheet 2
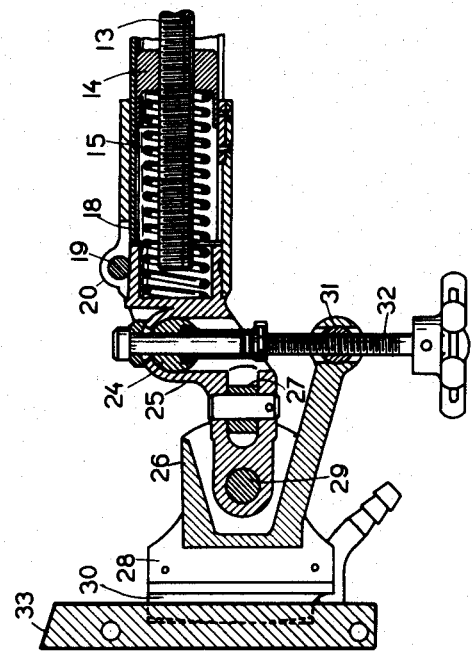
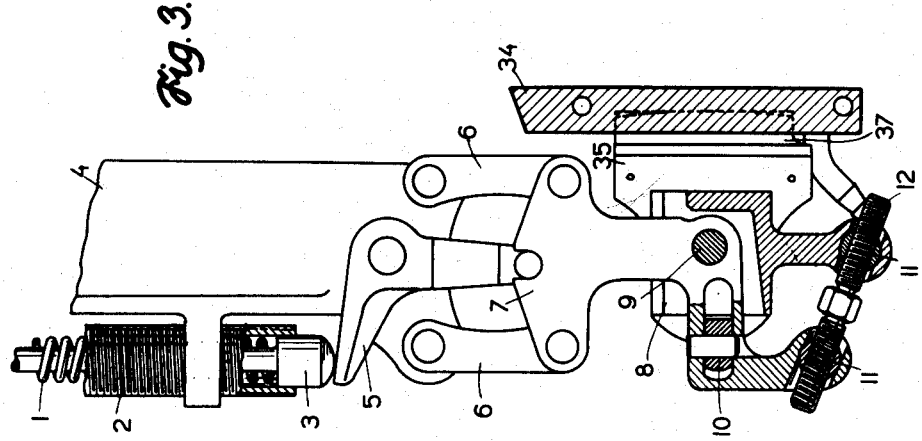
INVENTOR.
Michal Bisťák
BY Richard Low
Agt

United States Patent Office 3,170,430
Patented Feb. 23, 1965

3,170,430
INSTALLATION FOR WELDING OR CASTING UNDER MOLTEN SLAG COOLED CLOSURE PLATES
Michal Bisták, Bratislava, Czechoslovakia, assignor to Výskumný ústav zváračský MHD., Bratislava, Czechoslovakia
Filed Jan. 24, 1962, Ser. No. 168,377
Claims priority, application Czechoslovakia, Feb. 3, 1961, PV 617/61
9 Claims. (Cl. 113—136)

The present invention relates to improvements in a mechanism for pressing into operative engagement cooled closure plates of a device for automatic welding or casting under molten slag, so-called under-slage welding.

The process of welding or casting under molten slag is characterized by the containment of the entire welding bath, in a metallic mold formed by the walls of the work-pieces to be welded and by two cooled closure plates. Such plates form either part of the welding or casting installation and are referred to as universal closure plates in that they are applicable to work-pieces of different shapes, or are provided as special closure plates of varying length and shape, which are pressed against the welded work-pieces independently of the welding device. Whether welding with strip electrodes or with wire electrodes, universal cooled closure-plates are mostly used. The way in which the closure plates are pressed into operative engagement with the work-pieces is of particular importance and affects not only the safety and dependability of the entire welding installation but also the shape and quality of the weld surface.

The cooled closure plates have heretofore been pressed against the treated work-pieces by means of mechanisms which do not permit adjustment of the position of the cooled closure plates when the welded pieces are offset or inclined with respect to one another. The known mechanisms do not permit vertical adjustment of the point of application of the pressure force neither during nor before the welding operation. When the work-pieces to be welded are not properly aligned, they are engaged by the upper or lower part of a cooled closure plate only so that the welding bath can run out. Another disadvantage of the known mechanisms is that they cannot be used for the production of circumferential welds or curved welds without suitable adaptation so that the welding installation equipped with such a mechanism is not suited for any type of weld.

A further great drawback of the heretofore used mechanisms for pressing the cooled closure plates into operative engagement with the work-pieces resides in the fact that their mounting on the welding installation does not allow the maintenance of the alignment of the welding gap with the cooled closure plate during the welding process since the cooled closure plates cannot be shifted in the horizontal direction transversely of the weld. Mechanisms for pressing the closure plates into operative engagement with the work-pieces by a parallelogram or simply by a U-shaped element are objectionable in that if the work-pieces to be welded are offset, the spacing between the sides of the parallelogram changes during the welding operation, which fact necessitates wider guiding channels to be provided in the cooled closure plates. Consequently, the cooled closure plates can deviate from the axis of the welding gap, which unfavorably affects the quality of the weld and can even result in an interruption of the welding operation. Moreover, in the heretofore produced welding installations the mechanisms for pressing the cooled closure plates into operative engagement with the work-pieces are rigidly mounted and can therefore, not be shifted toward and away from the work-pieces, which shortcoming considerably complicates and hinders the handling of the cooled closure plates during preparation of the welding installation for the welding process.

The principal object of the present invention is to avoid the aforementioned disadvantages by providing a universal pressure mechanism which can be used in connection with cooled closure plates of any design, and which is suitable for the production of straight and circumferential welds, while permitting exact guiding of the cooled closure plates, particularly in the direction transverse to the weld.

The universal pressure applying mechanism according to the invention comprises substantially—as in heretofore known devices of this type—two pressure exerting devices each urging a cooled closure plate against a side of the welding gap, the two sides being opposite each other. The pressure or force is transmitted through pressure applying rails to the cooled closure plates.

According to the main feature of the invention, the pressure rails are slidably mounted on one part of a two-armed lever, which is journalled on a pivot carried by an actuating arm. The other arm or part of the two-armed lever is connected to the actuating arm by means of a set screw for adjusting the position at which rounded outer edges of the pressure rails are contacted by a beam pivotally mounted in the actuating arm and transmitting the pressure or force to the rails. According to a further feature of the invention, the front or inner ends of the rails are preferably provided with exchangeable end-pieces having arcuate faces bearing directly on the cooled closure plates so that the axis passing through the center of the radius of curvature of the arcuate faces lies in a horizontal plane.

In the case of the pressure applying device arranged in front of the welding gap, the actuating arm is clamped in a sleeve slidable on a guide bush containing a known spring mechanism for exerting the desired force generally in the desired direction of the latter.

In the case of the pressure applying device in back of the welding gap, the actuating arm also forms the horizontal link of a vertical parallelogram, which further comprises vertical links and a suspension member. The spring mechanism exerts the force generally at right angles to the desired direction against a bell-crank pivoted on the suspension member and acting against the horizontal link formed by the actuating arm. This mechanism is, according to a further feature of the invention, preferably suspended from a knife which is displaceable in a horizontal and vertical plane and extending across the welding gap.

Further features and advantages of the present invention will appear in the following detailed description of an illustrative embodiment which is to be read in connection with the accompanying drawings, wherein:

FIGURE 1 is a perspective view of a welding installation provided with a mechanism for pressing the cooled closure plates against the work-pieces at the opposite sides of the welding gap in accordance with this invention, FIGURE 2 is a longitudinal sectional view of the front part of the pressure mechanism, and FIGURE 3 is a longitudinal sectional view of the rear part thereof.

The front portion of the pressure mechanism, shown in FIGURE 2, comprises two parallel pressure rails 28, slidably mounted in dovetail slots at the opposite sides of a two-armed lever 26, to transmit the force of the spring 15 to a cooled front closure-plate 33, said pressure rails 28 are equipped with exchangeable end-pieces 30 enabling the pressure mechanism to be used in connection with cooled closure plates of various designs. The force acting on both pressure rails 28 is transmitted to the latter by means of a beam 27 pivotally mounted, at its center, on a vertical pin carried by an actuating arm 25. Since rails 28 are slidably arranged in the dovetail portions of lever 26 and the pressure force is transmitted to the rails 28 by means of the beam 27, the pressure force can urge both sections of the cooled closure-plate tightly against the work-pieces even if they are offset relative to one another. The spacing between pressure rails 28 does not change, so that exact guiding of the cooled closure-plate 33 can be achieved.

The lever 26 is pivoted on the arm 25 by means of a horizontal pin 29. The two-armed lever 26, along with the pressure rails 28, can be angularly displaced relative to arm 25 about the pin 29 by means of the manually controlled set screw 32. Such angular displacement of the lever 26 and thus of pressure rails 28 serves to vertically displace the point of application of the pressure force upon the cooled closure plate 33. This displacement is further assisted by the exchangeable end pieces 30 of the pressure rails 28 which are provided with a slight curvature, as shown on FIG. 2 in broken lines.

The screw 32 is mounted in a cylindrical nut 31 turnable about an axis parallel to pin 29 in the lever 26 and is secured in the arm 25 against movement in axial direction, but is free to rotate in a bushing 24 which is turnable in an arm 25 about an axis parallel to pivot pin 29. By turning the screw 32 in one direction, the cylindrical nut 31 moves downwardly along the screw 32 and lever 26 turns about the pin 29 in the clockwise direction. The point of application of the pressure force by the pressure rails 28 to closure plate 33 is displaced downwardly below the center of the cooled closure plate 33. By turning the set screw 32 in the opposite direction, nut 31 moves upwardly along screw 32 so that lever 26 rocks, along with pressure rails 28, about the pin 29 in the counterclockwise direction and the point of application of the pressure force is shifted above the center of the cooled closure plate 33.

In this way the pressure force acting on the cooled closure plate 33 can easily be concentrated at points where it is most necessary for maintaining contact of the plate with the welded work-pieces. However, the most important advantage of the described mechanism is that it can be used without any adaptation whatsoever even for the production of circumferential welds, as the set screw 32 enables the cooled closure plate 33 to be adjusted to any radius of cylindrical work-pieces which are to be welded.

The pressure mechanism according to the invention permits easy manipulation not only during the preparation of the installation for the welding process, but also after the welding process has been terminated, due to the special mounting of the pressure mechanism on the welding installation.

The arm 25 of the pressure mechanism terminates in a collar provided with a circumferential groove of arcuate cross-section, and inserted into the clamping sleeve 20. The clamping sleeve 20 is tightened on the collar by means of a screw 19, which partially engages the groove of arcuate-cross-section provided in the collar of the arm 25. The arm 25 can, thus, be adjusted as a whole about the horizontal axis of sleeve 20, while it is fixed in the direction of this axis by the clamping screw 19. By tightening the clamping screw 19 the arm 25 is rigidly connected to the clamping sleeve 20 which is slidable axially on the guide bush 18 and secured against rotation about its axis by a key slidable in a groove provided at the underside of the guide bush 18.

Accommodated in the guide bush 18 is a spring mechanism comprising a spring 15 whose pressure can be adjusted by means of a slidable nut 14 movable axially along a screw 13 which carries a handwheel. The spring mechanism is actuated by turning the handwheel, whereby the clamping sleeve 20 along with the arm 25 is urged away from or toward the bush 18, with the result that the cooled closure plate 33 is pressed against the welded work-pieces or removed from them.

In order to arrange for lateral manipulation of the front portion of the pressure mechanism, that is, the manipulation transversely of the weld, use is made of the mechanism within a sleeve 21 which forms a part of a cross-holder. Lateral movements of the front portion are controlled by a hand wheel 23 with the aid of a screw and a nut (not shown) provided within the sleeve 21 and by sliding the sleeve 21 along a tubular support 22. The mechanism used for lateral adjustments is similar to that used for movements of the pressure mechanism toward and from the work-pieces. As for the latter mechanism, the bush 18, the clamping sleeve 20, the arm 25, and associated parts are actuated to shift the front portion of the pressure mechanism toward and away from the work-pieces, whereby the bush 18 slides within the sleeve 17, another part of the referred to cross-holder. The sleeve 17 is secured to the sleeve 21 to form together with the latter an integral part. Once the cooled closure plate 33 has been roughly adjusted relative to the work-pieces to be welded, the pressure mechanism is fixed by clamping the guide bush 18 in the sleeve 17 by means of a screw with a handle 16. The appropriate pressure force is then obtained by adjusting the compression of the spring 15. This is accomplished by turning the handwheel and thereby also the pressure screw 13 in counter-clockwise direction.

The pressure mechanism including the cooled closure plate 33 can be displaced horizontally in the transverse direction with respect to the weld not only during adjustment of the pressure mechanism prior to, but also in the course of the welding operation. This is effected, as has already been indicated, by shifting the lower sleeve 21 of the cross-holder along a tubular support 22 by rotation of a hand-wheel 23. The tubular support 22 is rigidly fixed to a slide provided on the welding installation so that the entire pressure mechanism travels during the welding operation in vertical direction of welding with the speed of movement of said slide.

The back portion of the pressure mechanism, which is shown in detail in FIG. 3, comprises a suspension member 4 depending from a knife 36 extending preferably through the welding gap and fixed to a longitudinal support provided on the welding installation and adjustable in the horizontal and vertical plane. If the longitudinal support of the installation is secured to a transverse support, the knife 36 together with the suspension member 4 and the entire rear pressure mechanism can be adjusted by hand transversely to the weld, as desired, even in the course of the welding process. Secured to the suspension actuated mechanism 4 is a spring member of known design comprising a spring 1 mounted within a sleeve threaded in a lug of member 4 so as to be vertically adjustable. The spring 1 acts downwardly on a headed pin 3 which engages a bell-crank 5 pivoted on suspension member 4. The downwardly directed arm of bell-crank 5 carries a pin engaging in a groove formed at the center of a cross-head formed at the upper end of the actuating arm 7. The cross-head at the top of arm 7 is suspended pivotally from the lower end of member 4 by two vertical links 6. It will be apparent that links 6 and the portions of member 4 and of arm 7 connected thereby, form a deformable parallelogram. A lever 8 is pivoted about a horizontal pin 9 on the arm 7, and has dove-tailed portions in which the pressure rails 35 are slidably mounted. The pressure rails 35 carry exchangeable end-pieces 37 which are designed in the same way as the pressure rails 28 of the front portion shown in FIG. 2. The pressure force is transmitted to the pressure rails 35 by means of a beam 10 swingable about a vertical pivot carried by arm 7. In addition to the connection through the pin 9, the arm 7 and the lever 8 are connected by a set screw 12 provided with a right-hand and left-hand threaded end portions engaging in cylindrical nuts 11 carried by arm 7 and lever 8.

The end pieces 37 of rails 35 are slightly curved as shown in FIG. 3 in a broken line. The pressure rails 35 therefore are rockably engaged in channels provided in the rear of the cooled closure plate 34.

The rear pressure-mechanism operates as follows: By increasing the pressure of the spring 1 in the spring member, the arm 7 and the lever 8 are shifted horizontally through the bell-crank 5, with the result that the cooled closure plate 34 is pressed, with the aid of pressure rails 35, against the work-pieces undergoing welding. Due to the fact that the force acting on the pressure rails 35 is transmitted thereto by means of the beam 10 and that the pressure rails 35 are slidable in the dovetails of the lever 8, the pressure force is distributed uniformly between both pressure rails 35 even when the work-pieces are offset relative to one another.

The point of application of the pressure force can be displaced in the vertical direction by means of the set screw 12. As one part of the screw is provided with a left-hand and the other with a right-hand thread, rotation of the screw causes rocking movement of the lever 8 and rails 35 about the pin 9 relative to arm 7. By reason of the slightly curved end-pieces 37 of rails 35 which contact the cooled closure plate 34, the points of contact with the latter are moved upwardly or downwardly by such rocking of the rails 35.

The universal pressure mechanism according to the invention represents a considerable advance in the art, as it permits extensive adjustment of the welding installation before and during the welding operation, and above all rapid setting-up of the installation preparatory to the welding process, as well as quick re-adjustment, if and when required, even while the welding operation is under way. This is feasible mainly due to the whole pressure mechanism being slidable over a relatively large distance in the horizontal direction perpendicularly to the treated work-piece, which is of particularly importance when the welding process has to be interrupted and the liquid slag speedily discharged.

The pressure mechanism according to the invention affords the further advantage of being capable of use in connection with the production of straight and circumferential welds by reason of the possible vertical displacement of the point of application of the pressure force along the cooled closure plate. The pressure mechanism according to the invention can be used for cooled closure plates of any desired design, consisting either of one, two or three parts. The accuracy with which the closure plate is guided, particularly transversely to the weld, is superior to that which can be achieved with the heretofore known pressure mechanisms; this is due to the replacement of the horizontal parallelogram of the known devices by the dovetail mounting of the pressure rails, so that the spacing between the latter does not very during operation. The design of the rear portion (FIG. 3) of the pressure mechanism embodying the invention is such that this portion occupies the smallest possible space to avoid the use of large yokes for clamping the work-pieces under treatment.

The advance in the art achieved by the pressure mechanism according to the invention is to be seen in its safety of operation, its advantageous design in comparison with heretofore known mechanisms, which results in quicker and easier servicing, its all-round usability not only with regard to the treated materials but also the cooled closure plates and finally its ability to achieve welds of higher quality than could be achieved with known devices, said ability resulting from the high accuracy with which the cooled closure plates are guided.

What I claim is:

1. In an apparatus for welding under molten slag in a vertical welding gap between work-pieces and having cooled closure plates extending across the gap at the front and back of the work-pieces for containing the molten slag in the gap; front and back pressure applying devices for holding the closure plates tightly against the work-pieces, each of said devices comprising an actuating arm, means mounting said arm for generally horizontal movement toward and away from the work-pieces, a horizontal pivot on said arm, a lever swingable on said pivot relative to said arm, pressure exerting rails slidably mounted on said lever for generally horizontal movement relative to the latter, said rails having arcuate surfaces at one end for bearing against the related closure plates, a beam pivoted on said arm to swing relative to the latter about a vertical axis and bearing against the other ends of said rails, means for exerting a force urging said arm toward the work-pieces whereby said beam uniformly transmits said force to said rails for application by the latter to the related closure plates, and adjustable screw means connected to said arm and lever for angularly displacing the latter and said rails relative to said arm about said horizontal pivot, thereby to vertically vary the locations of the contacts of said arcuate surfaces of the rails with the related closure plates.

2. In an apparatus for welding under molten slag, front and back pressure applying devices as in claim 1; wherein said arcuate surfaces at one end of the pressure rails are substantially concentric with the axis of said horizontal pivot, and said other ends of the rails engaged by said beam are also arcuately concentric with said horizontal pivot.

3. In an apparatus for welding under molten slag, front and back pressure applying devices as in claim 2; wherein said arcuate surfaces at said one end of the rails are formed on replaceable end pieces.

4. In an apparatus for welding under molten slag, front and back pressure applying devices as in claim 1; wherein said means mounting the arm of the front device includes a horizontally extending sleeve clamped on said arm and a guide bush onto which said sleve is axially slidable; and wherein said means for exerting a force on said arm includes a spring actuated mechanism mounted in said guide bush and acting against said arm.

5. In an apparatus for welding under molten slag, front and back pressure applying devices as in claim 4; wherein said arm of the front device has a collar extending into said sleeve and formed with a circumferential groove, and said clamping sleeve is releasably secured on said collar by means of a tangential clamping screw engaging in said groove to prevent axial displacement of said collar relative to said sleeve.

6. In an apparatus for welding under molten slag, front and back pressure applying devices as in claim 1; wherein said adjustable screw means of each of the devices includes a screw member, and bearing members engaged by said screw member and being turnable in said arm and said lever, respectively, about axes parallel to said horizontal pivot.

7. In an apparatus for welding under molten slag, front and back pressure applying devices as in claim 6; wherein said screw member of the front device is threadably engaged with the related bearing member in said lever and held against axial displacement relative to the bearing member in said arm.

8. In an apparatus for welding under molten slag, front and back pressure applying devices as in claim 6; wherein said screw member of the back device has portions thereof with left and right-hand threads, respectively, which are threadably engaged with said bearing members in the related arm and lever.

9. In an apparatus for welding under molten slag, front and back pressure applying devices as in claim 1; wherein said means mounting the arm of the back device includes a suspension member, a pair of generally parallel, spaced apart links pivotally depending from said suspension member and pivotally connected to said arm so that the latter is movable toward and away from the work-pieces upon swinging of said links; and wherein said means for exerting a force urging said arm of the back device toward the work-pieces includes a bell-crank pivoted on said suspension member and having a generally vertical leg and a generally horizontal leg, coupling means between said vertical leg and said arm, and spring actuated means mounted on said suspension member alongside the latter and bearing against said horizontal leg of the bell-crank to urge the latter to rock in the direction moving said arm toward the work-pieces.

References Cited by the Examiner

UNITED STATES PATENTS

| | | | |
|---|---|---|---|
| 986,619 | 3/11 | Bach | 269—139 XR |
| 1,044,620 | 11/12 | Zawadzki | 269—203 |
| 1,157,815 | 10/15 | Skinner | 113—99 |
| 1,751,620 | 3/30 | Clarke | 269—256 XR |
| 2,089,840 | 8/37 | Rockefeller | 219—126 XR |
| 2,487,022 | 11/49 | La Placa | 269—139 XR |
| 2,781,441 | 2/57 | Ballentine et al. | 219—126 |
| 2,802,931 | 8/57 | Hess | 219—73 |
| 2,916,605 | 12/59 | Lucas | 219—126 |
| 2,988,354 | 6/61 | Schultz | 269—60 |
| 3,046,386 | 7/62 | Wooding et al. | 113—136 |

CHARLES W. LANHAM, *Primary Examiner.*

JOHN F. CAMPBELL, ROBERT F. WHITE, *Examiners.*